US008774859B2

(12) United States Patent
Roh

(10) Patent No.: US 8,774,859 B2
(45) Date of Patent: Jul. 8, 2014

(54) APPARATUS AND METHOD FOR IMPROVING RSE PERFORMANCE OF MULTI-STANDBY TERMINAL

(75) Inventor: Yang Woon Roh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 101 days.

(21) Appl. No.: 13/295,462

(22) Filed: Nov. 14, 2011

(65) Prior Publication Data

US 2012/0149313 A1    Jun. 14, 2012

(30) Foreign Application Priority Data

Dec. 10, 2010 (KR) .......................... 10-2010-0126060

(51) Int. Cl.
*H04M 1/00* (2006.01)

(52) U.S. Cl.
USPC .............. 455/553.1; 455/78; 455/82; 455/83; 455/552.1; 455/551; 455/558

(58) Field of Classification Search
USPC .......... 455/550.1, 552.1, 553.1, 551, 558, 78, 455/82, 83, 435.1–435.3
See application file for complete search history.

(56) References Cited

U.S. PATENT DOCUMENTS

| | | | | |
|---|---|---|---|---|
| 6,985,712 | B2 * | 1/2006 | Yamakawa et al. | 455/333 |
| 7,643,848 | B2 * | 1/2010 | Robinett | 455/552.1 |
| 7,814,237 | B2 * | 10/2010 | Lee et al. | 710/14 |
| 7,983,713 | B2 * | 7/2011 | Sasse et al. | 455/556.1 |
| 8,301,120 | B2 * | 10/2012 | Adams | 455/412.2 |
| 2003/0181192 | A1 * | 9/2003 | Park et al. | 455/335 |
| 2009/0256645 | A1 * | 10/2009 | Satoh et al. | 333/101 |

\* cited by examiner

*Primary Examiner* — Tuan A Tran
(74) *Attorney, Agent, or Firm* — Jefferson IP Law, LLP

(57) ABSTRACT

An apparatus and method for improving Radiated Spurious Emission (RSE) performance of a multi-standby terminal supporting $3^{rd}$ Generation (3G) and/or $4^{th}$ Generation (4G) service is provided. The method for enhancing RSE performance of a multi-standby terminal including an antenna for transmitting and receiving $2^{nd}$ Generation (2G) and 3G band signals, a Radio Frequency (RF) switch for switching between the 2G and 3G band signals, a 2G communication unit connected to the RF switch for transmitting and receiving 2G band signals, a 3G communication unit connected to the RF switch for transmitting and receiving 3G band signals, and a transceiver for processing the 2G and 3G band radio signals includes determining a frequency band by checking a user identity card, switching, when the recognized frequency band is the 3G band, the RF switch to establish a connection between the antenna and the 3G communication unit, and disabling the 2G communication unit.

13 Claims, 3 Drawing Sheets

APPARATUS AND METHOD FOR IMPROVING RSE PERFORMANCE OF MULTI-STANDBY TERMINAL

PRIORITY

This application claims the benefit under 35 U.S.C. §119(a) of a Korean patent application filed on Dec. 10, 2010 in the Korean Intellectual Property Office and assigned Serial No. 10-2010-0126060, the entire disclosure of which is hereby incorporated by reference.

BACKGROUND OF THE INVENTION

1. Field of the Invention

The present invention relates to a Radiated Spurious Emissions (RSE) performance enhancement apparatus and method of a multi-standby terminal. More particularly, the present invention relates to an apparatus and method for improving RSE performance of the multi-standby terminal supporting $3^{rd}$ Generation (3G) and/or $4^{th}$ Generation (4G) service.

2. Description of the Related Art

With the rapid advancement of information communication and semiconductor technologies, a mobile terminal has evolved into a multifunctional device incorporating various functions such as a TeleVision TV function (e.g., Digital Multimedia Broadcasting (DMB) and Digital Video Broadcasting (DVB)), an audio playback function (e.g., Moving Picture Experts Group (MPEG)-1 or MPEG-2 audio layer-3 (MP3)), a video capture function, a data communication function, an Internet access function, and a global positioning function. More particularly, a recently developed mobile terminal supports a multi-standby mode which is capable of communicating with two or more networks simultaneously. The dual-standby terminal connectable to Code Division Multiple Access (CDMA) and Global System for Mobile communication (GSM) networks simultaneously is a representative multi-standby terminal.

The multi-standby terminal is provided with multiple communication modules for communications with the corresponding radio communication networks. Typically, a communication module includes a duplexer (or diplexer), an antenna switch, a Surface Acoustic Wave (SAW) filter, a Power Amplifier Module (PAM), a Receive (RX) module, and a Transmission (TX) module. As a result of the multi-standby terminal being provided with multiple communication modules, there is a lack of installation space in the multi-standby terminal. In order to address this problem, the multi-standby terminal of the related art supporting $3^{rd}$ Generation (3G) and/or $4^{th}$ Generation (4G) services is configured with a communication circuit that includes a Front End Module (FEM). However, the multi-standby terminal of the related art is vulnerable to harmonic attenuation. For this reason, the FEM-based multi-standby terminal of the related art has a drawback in that an abnormal spurious wave is generated when all the multiple communication modules operate in a transmission mode or when a communication module is in a monitoring mode while another one is in the transmission mode. That is, the FEM-based multi-standby terminal of the related art deteriorates the Radiated Spurious Emission (RSE) performance. This problem is becoming a significant issue for the FEM-based multi-standby terminal supporting 3G and/or 4G services.

SUMMARY OF THE INVENTION

Aspects of the present invention are to address at least the above-mentioned problems and/or disadvantages and to provide at least the advantages described below. Accordingly, an aspect of the present invention is to provide an apparatus and method that is capable of improving Radiated Spurious Emission (RSE) performance of a multi-standby terminal supporting $3^{rd}$ Generation (3G) and/or $4^{th}$ Generation (4G) services.

Another aspect of the present invention is to provide a RSE performance enhancement method and apparatus of a terminal using a Front End Module (FEM) that is capable of canceling spurious waves generated abnormally.

In accordance with an aspect of the present invention, an apparatus for enhancing RSE performance of a multi-standby terminal is provided. The apparatus includes a first communication module. The first communication module includes an antenna for transmitting and receiving $2^{nd}$ Generation (2G) and 3G band signals, a Radio Frequency (RF) switch, connected to the antenna at one end, for switching between the 2G and 3G signals, a 2G communication unit, connected to the RF switch, for transmitting and receiving the 2G band signals, a 3G communication unit, connected to the RF switch, for transmitting and receiving the 3G band signals, and a first transceiver, connected to the 2G and 3G communication units, for modulating and up-converting signals to be transmitted on the 2G and 3G bands, and for down-converting and demodulating signals received on the 2G and 3G bands. The 2G communication unit includes a first power amplifier module, connected to the first transceiver, for amplifying power of a transmission signal of the 2G band, a first filter for filtering out a received signal of the 2G band, and a first antenna switch module for establishing a connection between the RF switch and the first power amplifier module in a transmission period of the 2G communication unit and a connection between the RF switch and the first filter in a reception period of the 2G communication unit.

In accordance with another aspect of the present invention, a method for enhancing RSE performance of a multi-standby terminal including an antenna for transmitting and receiving 2G and 3G band signals, a RF switch for switching between the 2G and 3G band signals, a 2G communication unit connected to the RF switch for transmitting and receiving 2G band signals, a 3G communication unit connected to the RF switch for transmitting and receiving 3G band signals, and a transceiver for processing the 2G and 3G band radio signals are provided. The method includes determining a frequency band by checking a user identity card, switching, when the recognized frequency band is the 3G band, the RF switch to establish a connection between the antenna and the 3G communication unit, and disabling the 2G communication unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, description of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While exemplary embodiments of the present invention are described in the context of a dual-standby terminal as a representative multi-standby terminal for convenience in description, the present invention is not limited thereto. That is, the multi-standby terminal can be any of the terminals that can be in a standby state for at least two radio communication systems including Code Division Multiple Access (CDMA), Global System for Mobile communication (GSM), General Packet Radio Service (GPRS), Enhanced Data GSM environment (EDGE), Universal Mobile Telecommunication System (UMTS), Wideband CDMA (WCDMA), and $3^{rd}$ Generation Partnership Project (3GPP) and their equivalent systems. Exemplary embodiments of the present invention are directed to the case of Radiated Spurious Emission (RSE) performance enhancement in a dual-standby terminal.

Figure 1:
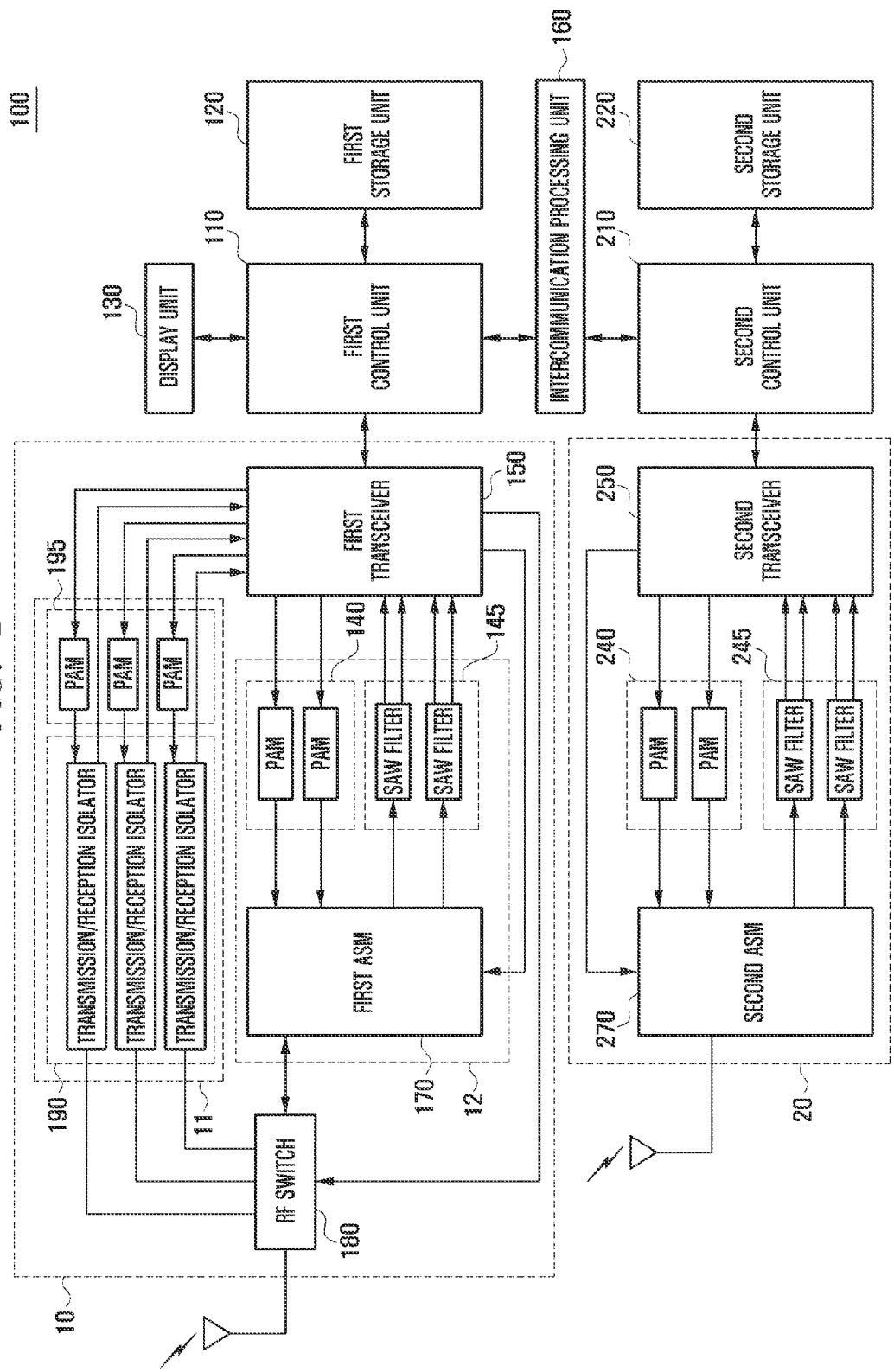
FIG. 1 is a block diagram illustrating a configuration of a dual-standby mode terminal according to an exemplary embodiment of the present invention.
Figure 2:
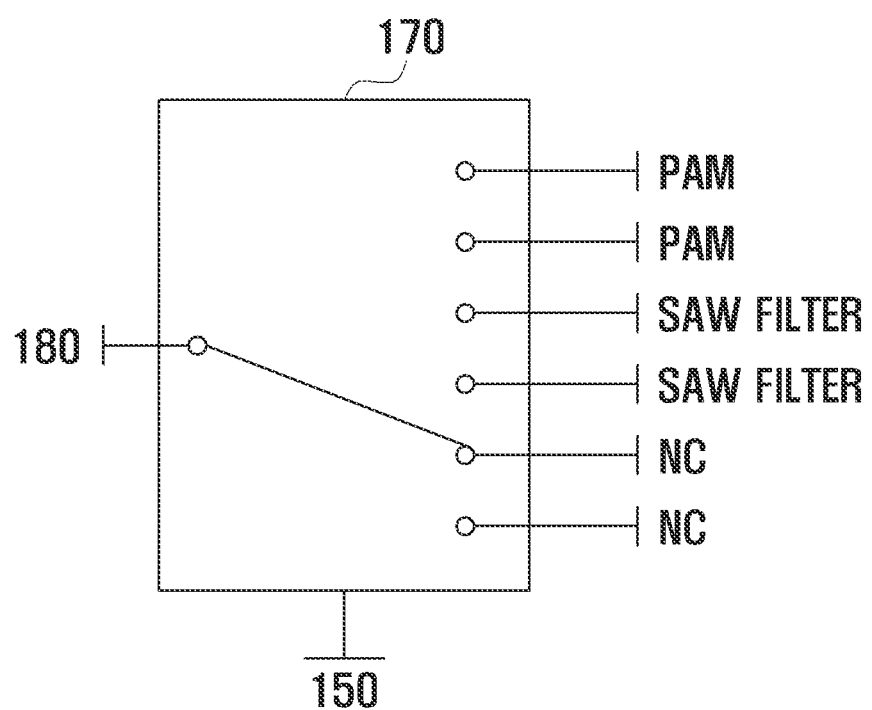
FIG. 2 is a diagram illustrating a configuration of the first Antenna Switch Module (ASM) of FIG. 1 according to an exemplary embodiment of the present invention.

FIG. 1 is a block diagram illustrating a configuration of a dual-standby mode terminal according to an exemplary embodiment of the present invention, and FIG. 2 is a diagram illustrating a configuration of the first Antenna Switch Module (ASM) of FIG. 1.

Referring to FIGS. 1 and 2, the terminal 100 includes a first communication module 10, a second communication module 20, a first control unit 110, a first storage unit 120, a display unit 130, an intercommunication processing unit 160, a second control unit 210, and a second storage unit 220. The first communication module 10 includes a first Power Amplifier Module (PAM) 140, a first filter unit 145, a first transceiver 150, a first Antenna Switch Module (ASM) 170, a Radio Frequency (RF) switch 180, a transmission/reception isolator 190, and a second PAM 195; and the second communication module 20 includes a second transceiver 250, a third PAM 240, a second filter 245, and a second ASM 270.

The display unit 130 displays the information input by or provided to the user as well as various menus of the terminal 100. For example, the display unit 130 can display various screens such as a standby mode screen, a message composition screen, and a call progress screen. The display unit 130 can be implemented with one of a Liquid Crystal Display (LCD) display unit, an Organic Light Emitting Diode (OLED) display unit, and an Active Matrix OLED (AMOLED) display unit. In a case where the display unit 130 is equipped with a touchscreen function, the display unit can work as an input unit (not shown).

The intercommunication processing unit 160 provides a communication interface between the first and second control units 110 and 210 to enable operations in compliance with different communication standards. The intercommunication processing unit 160 can be implemented with a Dual Ported Random Access Memory (DPRAM).

The first storage unit 120 can store programs related to the general operations of the terminal 100, $2^{nd}$ Generation (2G) and $3^{rd}$ Generation (3G) radio communication services and data generated by the applications. That is, the first storage unit 120 can store an Operating System (OS) for booting the terminal 100 and application programs and data used for the operations of the terminal 100. The second storage unit 220 can store the application programs used for supporting the 2G radio communication service and data generated while the application programs are running. Although the first and second storage units 120 and 220 are implemented separately, the present invention is not limited thereto. That is, the first and second storage units 120 and 220 can be implemented as the two regions of a single memory.

The first control unit 110 can control the overall operations of the terminal 100 and signaling among the internal function blocks. The first control unit 110 can be a primary (master) control unit of the terminal 100. The first control unit 110 can support both the 2G and 3G radio communication services by means of the first communication module 10. The first control unit 110 checks the attached subscriber identity card and determines the frequency band corresponding to the subscriber identity card and controls the first communication module 10 to operate on the determined frequency band. The subscriber identity card may be a Subscriber Identity Module (SIM) card. The first control unit 110 notifies the first transceiver 150 of the determined band so as to control the switching operation of the first antenna switch module 170 and the RF switch 180 by means of the first transceiver 150.

The second control unit 210 can act as the secondary (slave) control unit for supporting the 2G radio communication by means of the second communication module 20. The second control unit 210 checks the attached subscriber identity card for the 2G service, when the 2G service is provided on multiple bands, and determines the frequency band corresponding to the subscriber identity card and controls the second communication module 20 to operate on the determined frequency band.

The first communication module 10 is a device for supporting the 2G and 3G radio communication services so as to transmit/receive the radio signal in the 2G and 3G bands. The first communication module 10 can include a 3G communication unit 11, a 2G communication unit 12, a first transceiver 150, and an RF switch 180. The 2G communication unit 12 is the communication unit for transmitting/receiving 2G band signals an includes the first PAM 140, the first filter unit 145, and the first ASM 170; and the 3G communication unit 11 is the communication unit for transmitting/receiving 3G band signals and includes the transmission/reception isolator 190 and the second PAM 195.

The first transceiver 150 can transmit and receive a radio signal on a plurality of frequency bands. For example, the first transceiver 150 can support at least one 2G radio and at least one 3G radio. FIG. 1 shows an exemplary case where two 2G band and three 3G band radio signals are transmitted/received. However, the present invention is not limited thereto. That is, the numbers of the 2G and 3G bands supported by the first transceiver 150 can be changed as desired.

In order to transmit/receive a radio signal, the first transceiver 150 can modulate and up-convert the transmission signal output by the first control unit 110 and transfer the 2G band signal to the first PAM 140 and the 3G signal to the second PAM 195. The first transceiver 150 down-converts and demodulates the 2G and 3G band radio signals received through the antenna and transfers the demodulated signals to the first control unit 110. More particularly, in an exemplary embodiment of the present invention, the first transceiver 150 can control the switching operations of the first antenna switch module 170 and the RF switch 180. In a case where the first communication module 10 is configured to transmit and receive the 3G band radio signal, the first transceiver 150 generates a control signal that is sent to the RF switch 180 to establish a connection between the antenna and the 3G communication unit 11 and generates a control signal that is sent to the first ASM 170 to disable the 2G communication unit 12.

The first PAM 140 can amplify the power of the 2G band signal transmitted by means of the first transceiver 150. The first PAM 140 can amplify the power of the 2G band transmission signal. The first PAM 140 can include a plurality of power amplification modules, as many as the number of 2G bands (GSM 850, GSM 900, DCS 1800, and PCS 1900).

The first filter unit 145 filters out the 2G band signal received from the first ASM 170 and transfers the filtered signal to the first transceiver 150. The first filter unit 145 can be composed of Surface Acoustic Wave (SAW) filters. The first filter unit 145 can be composed of a plurality of SAW filters, as many as the number of 2G bands simultaneously supported by the terminal 100.

The first ASM 170 can switch between a transmission signal and a reception signal of the 2G band. That is, the first ASM 170 switches to establish the connection between the RF switch 180 and the first PAM 140 in the transmission period of the 2G communication unit 12 and the connection between the RF switch 180 and the first filter unit 145 in the reception period of the 2G communication unit 12. For this purpose, the first ASM 170 may be implemented with a Single Pole multiple Throw (SP×T) switch including one input node connecting to the RF switch 180 and a plurality of output nodes connecting to the PAM 140 and the first filter unit 145. The first ASM is preferably implemented with a PIN Diode with good attenuation characteristics. In a case where the first communication module 10 is configured to transmit and receive 3G band radio signals, the first ASM 170 can be disabled. In more detail, as shown in FIG. 2, the first ASM 170 can connect the input node (a) connected to the RF switch 180 to an open node (Not Connected: NC) among a plurality of output nodes such that the path between the RF switch 180 and the first ASM 170 is shortened, according to the control signal of the first transceiver 150. In this manner, an exemplary embodiment of the present invention is capable of preventing the 2G band signal from being applied to the RF switch 180, resulting in improvement of RSE performance of the dual-mode terminal 100.

The RF switch 180 can switch between the 3G band radio signal and 2G band radio signal according to the control signal. The RF switch 180 is composed of an input node connected to the antenna and a plurality of output nodes connected to the first ASM 170 and the transmission/reception isolator so as to connect the antenna to one of the output nodes according to the control signal. For example, in a case where the first control unit 110 is configured to provide the 2G band radio communication service, the RF switch 180 can connect the antenna to the first ASM 170.

The transmission/reception isolator 190 can isolate the 3G band transmission and reception radio signals from each other. The transmission/reception isolator 190 can be composed of a plurality of transmission/reception isolations modules, as many as the number of 3G bands supported by the terminal. The transmission/reception unit 190 can be a duplexer. The second PAM 195 can amplify the 3G band transmission signal from the first transceiver 150 and output the amplified signal to the transmission/reception isolator 190. The second PAM 195 can be composed of a plurality of power amplifiers, as many as the number of the 3G bands supported by the terminal 100.

The second communication module 20 is the device for providing 2G radio communication service so as to transmit and receive 2G band radio signals. The second communication module 20 can include the second transceiver 250, the second PAM 240, the second filter 245, and the second ASM 270.

The second transceiver 250 can transmit and receive various 2G band signals (e.g., GSM 850, GSM 900, DCS 1800, and PCS 1900). In order to transmit and receive such radio signals, the second transceiver 250 can modulate and up-converts the transmission signal input by the second control unit 210 and outputs the converted signal to the second PAM 240. The second transceiver 250 also can down-convert and demodulate the 2G band radio signal received through the antenna 250 and output the demodulated signal to the second control unit 210. The second transceiver 250 can control the switching operation of the second ASM 270. Except for the second transceiver 250 not processing the 3G band radio signals, the second transceiver 250 is responsible for the same functions as the first transceiver 150.

The third PAM 240 performs functions similar to those of the first PAM 140, the second filter 245 performs functions similar to those of the first filter 145, and the second ASM 270 performs functions similar to those of the first ASM 170. For this reason, a detailed description on the third PAM 240, the second filter 245, and the second ASM 270 are omitted herein.

Although it is depicted that the second communication module 20 transmits and receive the 2G band radio signals in FIG. 1, the present invention is not limited thereto. That is, the terminal can be configured such that both the first and second communication modules 10 and 20 can transmit and receive the 3G band radio signals. At this time, it is preferred that the second communication module 20 is configured in the same configuration of the first communication module 10. Although the description herein is directed to the case where the terminal transmits and receives 2G and 3G band radio signals, the present invention is not limited thereto. That is, an exemplary embodiment of the present invention can be applied to the multi-standby terminal supporting $4^{th}$ Generation (4G) band signal communication. Although it is depicted that the first transceiver 150 controls switching between the first ASM 170 and the RF switch 180 in FIG. 1, the present invention is not limited thereto. That is, the switching operation between the first ASM 170 and the RF switch 180 can be controlled by the first control unit 110.

Although it is depicted that the first and second communication modules 10 and 20 include separate antennas, the present invention is not limited thereto. That is, the first and second communication modules 10 and 20 can share one antenna. In this case, it is preferred that the terminal 10 include a means for isolating the frequency bands of the first and second communication modules 10 and 20 from each other (e.g. a diplexer).

Although not depicted in FIG. 1, the terminal 100 can further include at least one supplementary function component including a camera module for capturing still and/or motion pictures, a broadcast module for receiving broadcast signal, an audio playback module such as a Moving Picture Experts Group (MPEG)-1 or MPEG-2 audio layer-3 (MP3) module, and an approach sensor module for sensing approach of an object.

Figure 3:
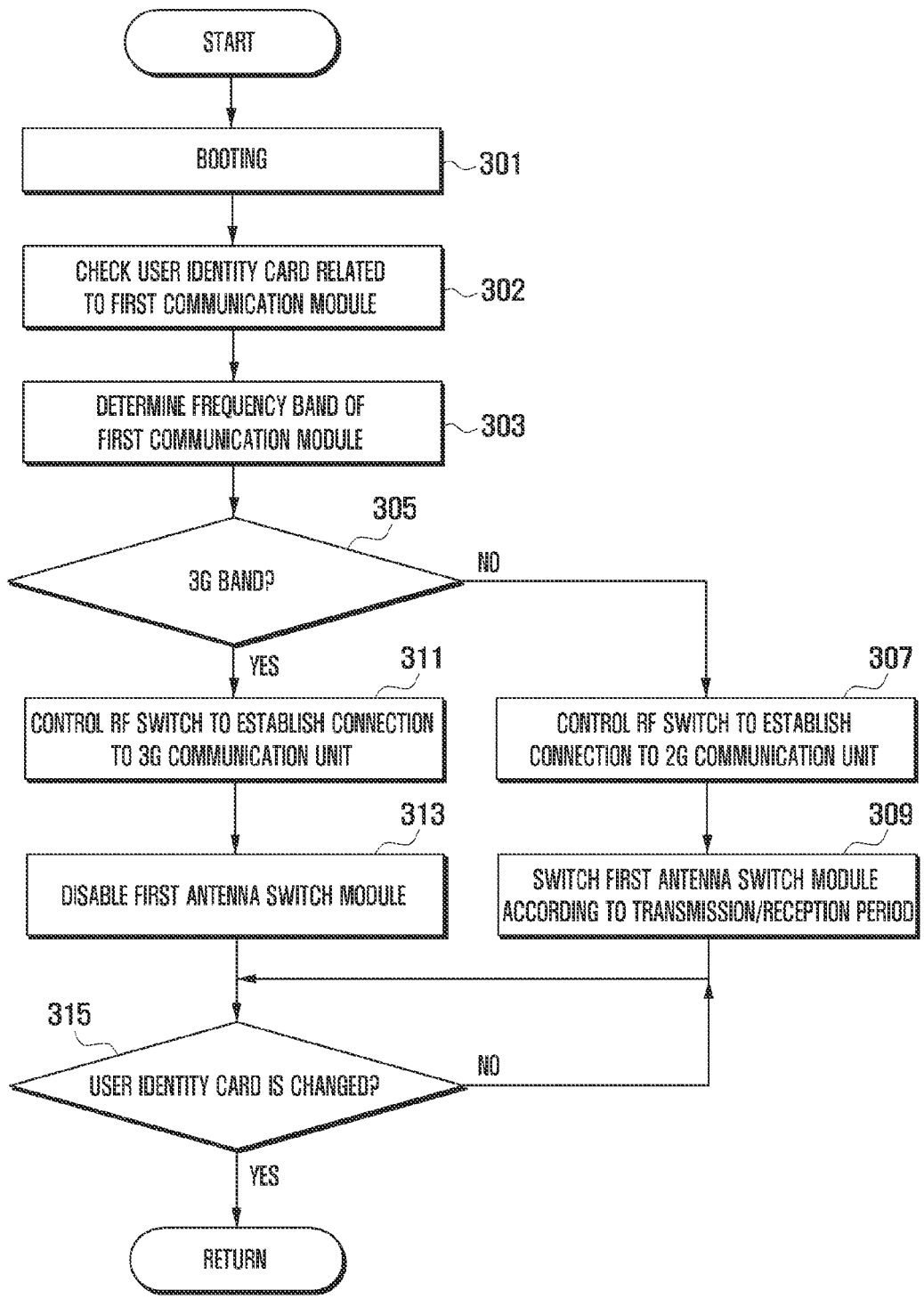
FIG. 3 is a flowchart illustrating a method for improving Radiated Spurious Emission (RSE) performance of a multi-standby terminal according to an exemplary embodiment of the present invention.

FIG. 3 is a flowchart illustrating a method for improving RSE performance of a multi-standby terminal according to an exemplary embodiment of the present invention. Hereinafter, operations of the first communication module 10, which is capable of transmitting and receiving 2G and 3G band radio signals, are described.

Referring to FIGS. 1 to 3, the multi-standby terminal 100 according to an exemplary embodiment of the present invention boots up in step 301. Next, the first control unit 110 checks a user identity card related to the first communication module 10 in step 302 and determines the frequency band of the first communication module 10 in step 303. For example, the first control unit 110 can search a SIM related to the first communication module 10 for a Mobile Network Code (MNC) to determine the frequency band.

The first control unit 110 can determine whether the determined frequency band is a 3G band in step 305. If the determined frequency band is not the 3G band, i.e. a 2G band, the first control unit 110 controls the RF switch 180 to establish a connection to the 2G communication unit 12 in step 307. That is, the first control unit 110 controls the RF switch 180 to establish the connection between the antenna and the first ASM 170. For this purpose, the first control unit 110 generates a control signal for controlling the switching operation that is sent to the first transceiver 150 and thus the first transceiver 150 forwards the control signal to the RF switch 180 as shown in FIG. 1. According to another exemplary embodiment of the present invention, the terminal can be configured such that the first control unit 110 generates the control signal that is sent to the RF switch 180 directly.

The first ASM 170 can connect the RF switch 180 to the first PAM 140 or the first filter 145 in accordance with the transmission period in step 309.

Otherwise, if the determined frequency band is the 3G band at step 305, the first control unit 110 controls the RF switch 180 to establish a connection to the 3G communication unit 11 in step 311. That is, the first control unit 110 can control the RF switch 180 to establish the connection between the antenna and the transmission/reception isolator 190. Next, the first control unit 110 disables the first ASM 170 in step 313. In more detail, the first control unit 110 controls such that the input node (a) is connected to the opened node (NC) in the first ASM 170 and, as a consequence, the path from the RF switch 180 to the first PAM 140 and first filter 145 is shortened. Although it is depicted that the first control unit 110 controls the switching operations of the RF switch 180 and the first ASM 170 via the first transceiver 150 in FIG. 1, the terminal can be configured such that the first control unit 110 controls the switching operations of the RF switch 180 and the first ASM directly in another exemplary embodiment.

Afterward, the first control unit 110 performs monitoring to determine whether the user identity card is changed for another one in step 315. As long as the user identity card is not changed, the first control unit 110 continues monitoring and, otherwise, if the user identity card is changed, the procedure returns to step 301. This is because it is assumed that the change of the user identity card follows the power-off of the terminal 100. In a case where the user identity card change without power-off is supported, when the user identity card is changed for another one, the procedure returns to step 302.

Although the above description has been directed to the operations of the first communication module 10, the above-described operation can be performed by the second communication module 20 which is configured to support both the 2G and 3G radio communication services. Although the above description has been directed to the case where the first communication module 10 supports 2G and 3G radio communication services, exemplary embodiments of the present invention can be applied to the multi-standby mode terminals supporting two or more different generation radio communication services, including 4G radio communication services.

As described above, the RSE performance enhancement apparatus and method of a multi-standby terminal supporting 3G and/or 4G radio communication services according to exemplary embodiments of the present invention are advantageous in that they improve the RSE performance by protecting against the generation of spurious waves.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for enhancing Radiated Spurious Emission (RSE) performance of a multi-standby terminal, the apparatus comprising:
    a first communication module comprising:
        an antenna for transmitting and receiving $2^{nd}$ Generation (2G) and $3^{rd}$ Generation (3G) band signals;
        a Radio Frequency (RF) switch, connected to the antenna at one end, for switching between the 2G and 3G signals;
        a 2G communication unit, connected to the RF switch, for transmitting and receiving the 2G band signals;
        a 3G communication unit, connected to the RF switch, for transmitting and receiving the 3G band signals; and
        a first transceiver, connected to the 2G and 3G communication units, for modulating and up-converting signals to be transmitted on the 2G and 3G bands, and for down-converting and demodulating signals received on the 2G and 3G bands,
        wherein the 2G communication unit comprises:
            a first power amplifier module, connected to the first transceiver, for amplifying power of a transmission signal of the 2G band;
            a first filter for filtering out a received signal of the 2G band; and
            a first antenna switch module for switching a connection to the RF switch between the first power amplifier module in a transmission period of the 2G communication unit and the first filter in a reception period of the 2G communication unit; and
    a second communication module that transmits and receives at least one of the 2G and 3G band signals, wherein the multi-standby terminal supports a multi-standby mode in which the multi-standby terminal for simultaneously transmitting and receiving the 2G and the 3G band signals via at least two networks.

2. The apparatus of claim 1, further comprises a first control unit for checking a user identity module, determining a frequency band corresponding to the user identity module, and for sending the recognition result to the first transceiver.

3. The apparatus of claim 2, wherein the first transceiver controls the RF switch to establish, when the determined frequency band is the 3G band, a connection between the antenna and the 3G communication unit and controls to disable the first antenna switch module of the 2G communication unit.

4. The apparatus of claim 3, wherein the first antenna switch module connects an input node linked to the RF switch to an opened node when a disable request is received.

5. The apparatus of claim 2, wherein the first transceiver controls the RF switch to establish, when the determined frequency band is the 2G band, a connection between the antenna and the 2G communication unit and controls to switch the first antenna switch module according to the transmission and reception periods of the 2G communication unit.

6. The apparatus of claim 5, wherein the first antenna switch module connects an input node linked to the RF switch to a node linked to the first power amplifier module during the transmission period of the 2G communication unit, and connects an input node linked to the RF switch to a node linked to the first filter during the reception period of the 2G communication unit.

7. The apparatus of claim 2, wherein the first control unit checks a user identity card, determines a frequency band corresponding to the user identity card, controls the RF switch to establish connection between the antenna and the 3G communication unit when the determined frequency band is the 3G band, and disables the first antenna switch module.

8. The apparatus of claim 2, wherein the first control unit checks a user identity card, determines a frequency band corresponding to the user identity card, controls the RF switch to establish connection between the antenna and the 2G communication unit when the determined frequency band is the 2G band, and switches the first antenna switch module according to the transmission and reception periods of the 2G communication unit.

9. The apparatus of claim 1, wherein the first antenna switch module comprises a pin diode.

10. The apparatus of claim 1, wherein the first antenna switch module comprises a single pole multiple throw switch.

11. A method for enhancing Radiated Spurious Emission (RSE) performance of a multi-standby terminal including an antenna for transmitting and receiving $2^{nd}$ Generation (2G) and $3^{rd}$ Generation (3G) band signals, a Radio Frequency (RF) switch for switching between the 2G and 3G band signals, a first communication module including a 2G communication unit connected to the RF switch for transmitting and receiving 2G band signals and a 3G communication unit connected to the RF switch for transmitting and receiving 3G band signals, a second communication module that transmits and receives at least one of the 2G and 3G band signals, and a transceiver for processing the 2G and 3G band signals, the method comprising:

determining a frequency band by checking a user identity card;

switching, when the determined frequency band is the 3G band, the RF switch to establish a connection between the antenna and the 3G communication unit; and disabling the 2G communication unit, wherein the multi-standby terminal supports a multi-standby mode in which the multi-standby terminal for simultaneously transmitting and receiving the 2G and the 3G band signals via at least two networks.

12. The method of claim 11, wherein disabling of the 2G communication unit comprises breaking a path between the RF switch and the transceiver.

13. The method of claim 11, wherein, when the determined frequency band is the 2G band, establishing a connection between the antenna and the 2G communication unit via the RF switch.

* * * * *